United States Patent Office 3,036,877
Patented May 29, 1962

3,036,877
TREATING TANNED LEATHER WITH CONDENSATION PRODUCT OF POLYCYCLIC HYDROCARBON, CARBOXYLIC ACID, AND OXO-COMPOUND
Wolfhard Luck, Koln-Stammheim, and Gustav Mauthe, Opladen, Germany, assignors to Farbenfabriken Bayer Aktiengesellschaft, Leverkusen, Germany, a corporation of Germany
No Drawing. Filed July 7, 1959, Ser. No. 825,422
Claims priority, application Germany July 23, 1958
5 Claims. (Cl. 8—94.24)

The present invention relates to new and useful tanning agents and to a process of preparing leather.

According to the present invention mineral tanned leather especially chrome tanned leather can be improved by treatment with aqueous solutions, of water-soluble resin like mixed condensation products respectively the alkali metal-, ammonium- and amine salts which are obtainable by condensation of the aromatic hydrocarbons having condensed benzene nuclei particularly naphthalene, alkyl- or alkoxy-naphthalenes, with oxo compounds particularly formaldehyde or substances yielding formaldehyde, and with aromatic carboxylic acids which contain in the nucleus hydroxy groups and hydrogen atoms capable to react with oxo compounds. This condensation is carried out in the presence of acid condensation agents expediently at an elevated temperature, and preferably in an aqueous medium.

Aromatic hydrocarbons with condensed benzene nuclei which may be used for the process for preparing these condensation products are, for example, naphthalene, anthracene or phenanthrene. Naphthalene or naphthalenes substituted by alkyl or alkoxy groups such as 1-methyl-naphthalene, 1-ethyl-naphthalene, 1-propylnaphthalene, 2-methyl-naphthalene, 2-ethyl-naphthalene, 2-propyl-naphthalene or 1-methoxy-naphthalene, 1-ethoxy-naphthalene, 2-methoxy-naphthalene, 2-ethoxy-naphthalene are preferably used.

Salicylic acid is an aromatic hydroxy-carboxylic acid which is particularly suitable as aromatic hydroxy carboxylic acid. However, other hydroxy-carboxylic acids such as 4-hydroxy-benzoic acid or cresotic acids may also be used with good result. Formaldehyde or a compound yielding formaldehyde such as paraformaldehyde, hexamethylene tetramine or methylal, are used as oxo-compounds with particular advantage. As acid condensation agent there is used, for example, sulfuric acid, phosphoric acid or zinc chloride and, preferably, hydrochloric acid.

The proportions of the reaction partners to be reacted with one another may vary within wide limits. Usually 0.5 to 3 mols, but preferably not more than 2 mols of an aromatic hydrocarbon with condensed benzene nuclei are used per mol of aromatic carboxylic acid. Per mol of aromatic carboxylic acid and per mol of aromatic hydrocarbon with condensed benzene nuclei there are used between 0.3 and 2 mols, but preferably at least between about 0.75 and 1.5 mols each of formaldehyde. The larger the quantity of formaldehyde, referred to the amount of aromatic compounds, the more rapidly the condensation proceeds and the more viscous are the aqueous solutions of the condensation products in the form of their salts.

The condensation is advantageously carried out in an aqueous medium, at room temperature or slightly elevated temperature. In the course of the reaction a more or less viscous resin separates out. However, the condensation may also be effected with the addition of or only in an inert organic solvent such as glacial acetic acid or benzene, or also without any solvent in the melt.

Depending on the method of condensation and the type of reaction components employed the reaction products are highly viscous or brittle resins which are water-soluble in the form of their alkali metal, ammonium or amine salts. These salts are obtainable by dissolving the resins in an equivalent amount of an aqueous solution of sodium hydroxide, sodium carbonate, sodium bicarbonate, ammonia or a water-soluble amine. The resins are precipitated from these aqueous solutions by salts of polyvalent metals, for example chromium-, aluminium-, iron- or zirconyl salts, or by acids such as acetic acid.

In the form of their water-soluble alkali-, metal-, ammonium- or amine salts these mixed condensation products are useful as impregnating agents especially as re-tanning agents for plumping leather. Particularly the plumping after-treatment of leathers tanned with mineral tanning agents may be achieved according to this invention. Chromium leathers are drummed, for example, with an aqueous solution of the sodium- or ammonium salt of condensation products herein described. The product is rapidly taken up by the leather and precipitated in situ by the acids and chromium salts present in the leather. It is an advantage that in contrast to retanning of mineral tanned leathers with synthetic or vegetable tanning agents, the characteristic properties and appearance of a mineral especially chromium tanned leather are not influenced or only to a small extent by such an after-treatment.

The following examples are given for the purpose of illustrating but not limiting the preparation of the inventively used condensation products.

PREPARATION 1

A mixture of 138 parts by weight of salicylic acid, 128 parts by weight of naphthalene, 200 parts by weight of 30% wt.) formaldehyde and 300 parts by weight of 37% (wt.) hydrochloric acid are heated with stirring to the boiling point of the mixture and then refluxed with stirring for 3 hours. A resin separates in the course of the reaction which becomes more and more viscous. After completion of the condensation, the hot resin is separated and washed with hot water.

The resin can be dissolved in, for example, an equivalent amount of sodium hydroxide solution. Unreacted naphthalene (about 10–15% of the amount employed) is removed with steam. The resin can be precipitated from its aqueous solution with acids, for example, acetic acid or sulfuric acid, or with salts of polyvalent metals, for example chromium chloride. The resin can be used for example in the form of its water-soluble sodium salt with advantage for the after-treatment of chromium leather as described in the following example.

PREPARATION 2

69 parts by weight of salicylic acid, 128 parts by weight of naphthalene, 200 parts by weight of 30% (wt.) formaldehyde and 200 parts by weight of 37% (wt.) hydrochloric acid are heated together with stirring to the boiling point of the mixture and then refluxed with stirring for a further 11 hours. The separated resin is isolated and can be dissolved in a solution of sodium hydroxide or ammonia as described in Preparation 1.

PREPARATION 3

138 parts by weight of salicylic acid, 142 parts by weight of 1-methyl-naphthalene, 200 parts by weight of 30% (wt.) formaldehyde and 300 parts by weight of 37% (wt.) hydrochloric acid are heated together with stirring to the boiling point of the mixture and then boiled under reflux with stirring for another 4 hours. The separated resin is dissolved in an equivalent amount of dilute sodium hydroxide solution. The resin can be precipitated from this solution with acids or heavy metal salts.

Example 100 parts by weight of a shaved full chrome tanned cow hide which in the cut of the leather shows a pH-value of 4.3 to 4.5 are drummed with 5 to 6 parts by weight (referred to solid substance) of the condensation product described in Preparation 1, and 150 parts by weight of water, at a temperature of 50° of the liquor. According to the intensity of the drumming process the product is taken up by the leather within 30 to 90 minutes, after which time the liquor is practically quantitatively exhausted. The exhausted float then has a pH-value of 5 to 5.5. The leather afterwards is fat-liquored in the same float and finished in the usual manner. There is obtained a full leather with a firm, tight grain.

We claim:

1. Method for the preparation of leather which comprises treating mineral tanned leather with condensation products obtained by reacting 0.5 to 3 mols of a polycyclic hydrocarbon having condensed benzene nuclei, 1 mol of an aryl hydroxy carboxylic acid and 0.6 to 4 mols of an oxo-compound at a temperature between 50–200° C. in the presence of an acid condensation catalyst.

2. Method for the preparation of leather which comprises treating mineral tanned leather with condensation products obtained by reacting 0.5 to 3 mols of a polycyclic hydrocarbon having condensed benzene nuclei selected from the group consisting of naphthalene, lower alkyl naphthalene and lower alkoxy naphthalene, 1 mol of a phenyl hydroxy carboxylic acid and 0.6 to 4 mols of formaldehyde at a temperature between 50–200° C. in the presence of an acid catalyst.

3. Method for the preparation of leather which comprises treating mineral tanned leather with condensation products obtained by reacting about 1–2 mols of a polycyclic hydrocarbon having condensed benzene nuclei selected from the group consisting of naphthalene, lower alkyl naphthalene and lower alkoxy naphthalene, 1 mol of a phenyl hydroxy carboxylic acid and 1.5 to 3 mols of formaldehyde at a temperature between 50–200° C. in the presence of an acid catalyst.

4. Method for the preparation of leather which comprises treating mineral tanned leather with condensation products obtained by reacting about 1–2 mols of naphthalene, 1 mol of salicylic acid, and 1.5 to 3 mols of formaldehyde at a temperature between 50–200° C. in the presence of hydrochloric acid.

5. Method for the preparation of leather which comprises treating mineral tanned leather with condensation products obtained by reacting about 1–2 mols of 1-methyl-naphthalene, 1 mol of salicylic acid and 1.5 to 3 mols of formaldehyde at a temperature between 50–200° C. in the presence of an acid catalyst.

References Cited in the file of this patent

UNITED STATES PATENTS 2,247,735      Speilberger et al. _____ July 1, 1941

OTHER REFERENCES

McLaughlin: "The Chemistry of Leather," Reinhold Pub. Corp., N.Y., 1945, pages 682–692.

Chen: "Syntans and Newer Methods of Tanning," The Chemical Elements, pp. 23–26.